United States Patent [19]

Gill

[11] Patent Number: 5,381,707

[45] Date of Patent: Jan. 17, 1995

[54] EXTENSION ARM FOR AN AUTOMOBILE JACK

[75] Inventor: Bryan D. Gill, Newmarket, Canada

[73] Assignee: Seeburn Metal Products Limited, Ontario, Canada

[21] Appl. No.: 57,499

[22] Filed: May 6, 1993

Related U.S. Application Data

[63] Continuation of Ser. No. 847,598, Mar. 4, 1992, Pat. No. 5,237,890.

[51] Int. Cl.6 .................. G05G 1/00; F16B 7/10
[52] U.S. Cl. ..................... 74/546; 403/108; 403/328; 24/615
[58] Field of Search ............. 74/546, 526, 527; 403/108, 328, 329; 24/615, 616, 573.1, 607

[56] References Cited

U.S. PATENT DOCUMENTS

| 3,118,696 | 1/1964 | Resare | 403/328 |
|---|---|---|---|
| 3,266,773 | 8/1966 | Cole | 254/100 |
| 3,669,463 | 6/1972 | Boudreau | 403/328 X |
| 3,712,652 | 1/1973 | Uilkema | 403/108 |
| 3,741,524 | 6/1973 | Morgan et al. | 254/122 |
| 4,085,763 | 4/1978 | Thomas | 403/328 X |
| 4,284,287 | 8/1981 | Esposito | 403/108 X |
| 4,314,691 | 2/1982 | Sato | 254/126 |
| 4,582,298 | 4/1986 | Boome et al. | 74/546 X |
| 4,583,713 | 4/1986 | Fukura et al. | 254/126 |
| 4,641,813 | 2/1987 | Arzouman | 254/8 B |
| 4,830,147 | 5/1989 | Kawada | 187/8.62 |
| 4,903,980 | 2/1990 | Schwartz | 403/108 X |
| 4,934,658 | 6/1990 | Berg et al. | 403/108 X |

FOREIGN PATENT DOCUMENTS

| 656903 | 4/1965 | Belgium | 403/328 |
|---|---|---|---|
| 2533704 | 6/1976 | Germany | 403/328 |
| 677029 | 8/1952 | United Kingdom | 403/108 |
| 1234390 | 6/1971 | United Kingdom | 403/108 |

*Primary Examiner*—Vinh T. Luong
*Attorney, Agent, or Firm*—Nixon & Vanderhye

[57] ABSTRACT

A lifting jack for automobiles has an extension arm with a particular fastener which may be used to connect longitudinally elongated tubular sections. A series of interlocking sections are provided which need not be identical (e.g. in particular having different ends). The sections are linked in a positive lock (snap fit) by a fastener having one or more resilient legs biasing a lug.

8 Claims, 4 Drawing Sheets

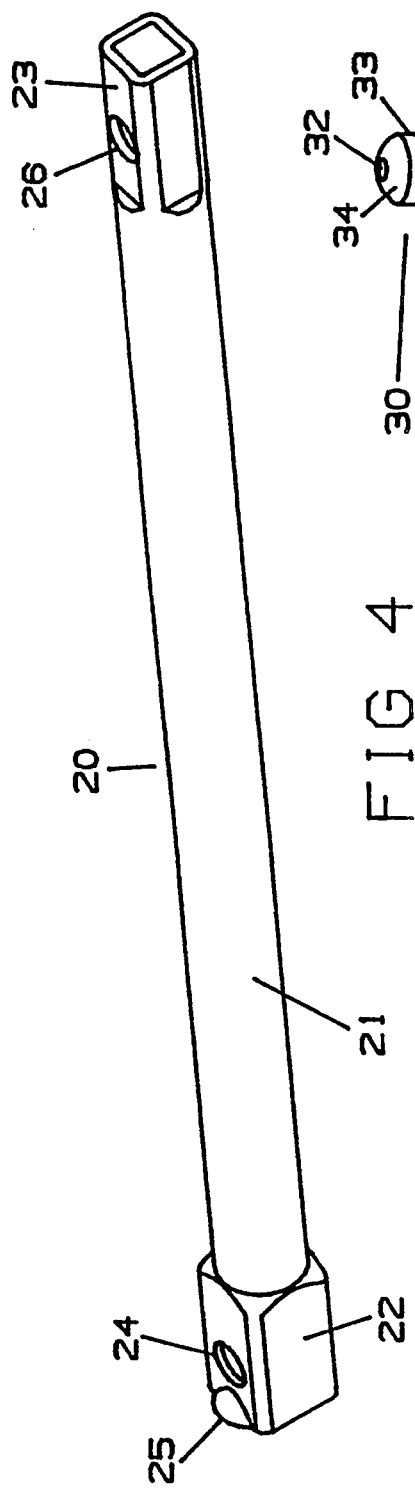
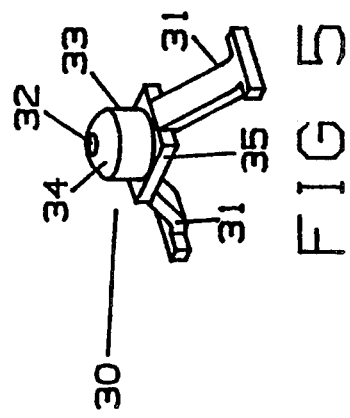
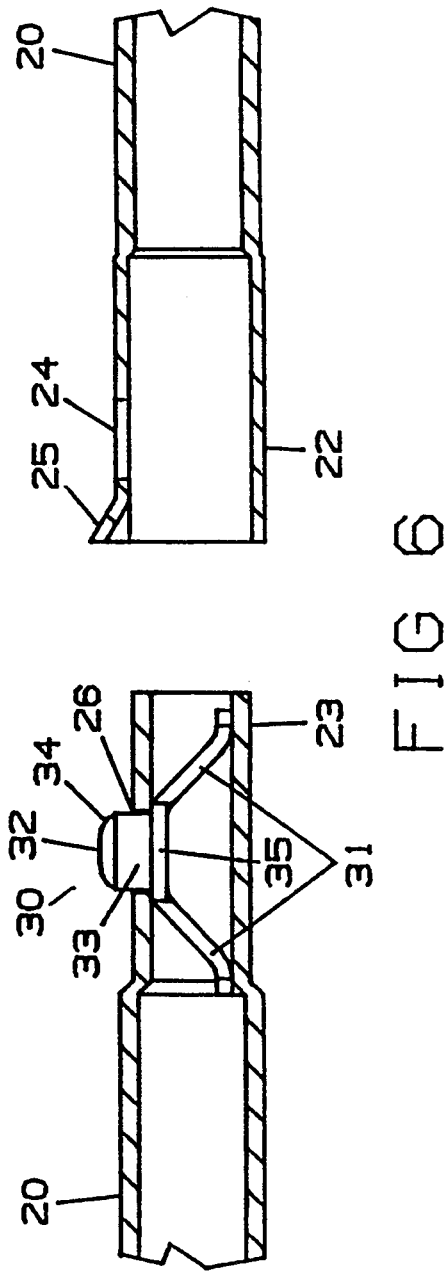

EXTENSION ARM FOR AN AUTOMOBILE JACK

This is a continuation of application Ser. No. 07/847,598, filed Mar. 4, 1992, now U.S. Pat. No. 5,237,890.

BACKGROUND AND SUMMARY OF THE INVENTION

This invention relates to lifting jacks used for automobiles and other vehicles and, in particular, relates to an extension arm to operate a jack. In another aspect, the invention relates to a novel fastener which may be used to connect longitudinally tubular sections and the like.

In the vehicle industry it is common to provide a portable jack to be stored in a vehicle to enable an operator in emergency situations to lift the vehicle to effect minor repairs, for example, to change a tire on the vehicle. There are many different types of jacks available but many, if not most, are driven either by a lever or a crank which in turn drive gears and/or screws in the jack to obtain a sufficient mechanical advantage to enable the operator to lift a vehicle.

In operation a jack is located under the portion of the vehicle to be lifted and braced against the nearest solid member which will bear the weight. Sometimes, however, particularly with trucks, a jack must be located far under the vehicle or in other positions where it would be awkward or even dangerous to be near the jack while it is being operated. Accordingly, it has become common in the industry to provide an extension arm to permit the operator to operate the jack at a distance. In order to facilitate storage Of the portable jack in the vehicle, such extension arms are often broken down into several similar sections which link together end to end when the jack is needed.

One known type of extension arm consists of a number of sections of round tubing. Each end of each section is formed square or rectangular to transmit torque. One end of each section has a larger cross section than the other end so that a smaller end of one section fits snugly into a larger end of an adjoining section. The squared ends allow the joined sections to transmit torque from one to another. A set screw is provided in each of the large ends to secure or to release the smaller end of the adjoining section. In some embodiments, an indentation or hole may be provided in the smaller end to receive the set screw to effect a more secure linkage. In some other embodiments, a winged flange is provided on the head of the set screw to facilitate turning without tools.

The above construction provides the advantage of positive locking of the tubular sections as they are linked. Positive locking permits the operator not only to operate the jack but also to push and pull the jack with the extension arm with confidence that the linkage will not separate. This feature is important because the operator may wish to position the jack under the vehicle by pushing, pulling and adjusting it with the extension arm.

The construction has certain disadvantages however. Tapping a hole in the larger ends and the provision of set screws increases manufacturing costs. In embodiments without a winged flange on the set screw, a tool is required to tighten it. Assembly and disassembly of the linkage with the set screw is more difficult than other types of arms described below. The set screws can be lost, bent or otherwise damaged since they project from the sides of the sections.

Another jack extension arm known in the prior art is made from solid round bars. The bars are linked by means of a sleeve welded to one end of each bar to project a short distance beyond the end. A hole is drilled through the portion of the sleeve projecting beyond the end of the bar. At the other end of each such bar, a side hole provides a well for a press stacked spring and a ball arrangement. Upon linkage of the bars, the sleeve at one end of a bar is fitted over the end of another bar having the steel ball and spring arrangement. The ball press fits into the hole of the sleeve and fastens the sections together.

The press fit spring, ball and sleeve construction provides ease of assembly since the sections snap fit together. It also has the advantage of easy disassembly since the sections may be simply pulled apart. Sufficient tension on the bars forces the sleeve over the ball and pushes it back into the hole whereupon the bars separate. The construction has disadvantages. A solid bar is required to hold the spring and ball assembly and, accordingly, the overall unit is heavier. Further the manufacturing costs of this construction are higher than the present invention. Finally, the advantage of the ease of assembly of the snap fit connection is offset by the disadvantage that the extension arm may pull apart if the operator pulls on it to adjust or remove the jack.

Another extension arm construction known in the industry has round tubes with hexagonal ends welded on one end of each tube to reinforce it to receive the other end of an adjoining tube in a telescoping fit. Two holes are drilled completely through each sleeve and its underlying tube. Another hole is provided in the opposite end of each tube. A wire clip is then provided in the hole through the sleeve and the tube. The ends of the wire are bent to secure it in position. When an adjoining tube is fitted into the receiving end the holes align over one another. The free end of the wire clip is inserted in the aligned holes to lock the two sections together.

This wire clip construction has advantages in that it uses light tubular sections and it is simple to manufacture. It is also reasonably easy to assemble and disassemble. It provides a positive locking assembly that tolerates pulling. It has disadvantages in that the wire clip is not as neat a fastening device as the ball lock and is not as easy to use. Further the projecting wire clip is subject to being damaged or bent when it is stored in the vehicle.

It is an object of the present invention to provide an novel extension arm for a vehicle jack, which provides economical manufacturing costs, a positive lock, ease of assembly and a neat package and to provide a novel fastener for connection of hollow sections.

The invention is a member having a series of interlocking sections. It is not necessary that all sections are identical. It is, however, desirable that sections are identical to others because then the sections are interchangeable. Some sections may have an end that is different from the first and second ends described below to enable the section to link to other parts such as a jack. In view of these possible different embodiments, the invention is described in terms of first and second ends which are abutting ends of two adjacent sections. It will be appreciated that in identical sections the first and second ends will also be opposite ends of each section.

In the member of interlocking sections of this invention each first end of a section fits within a second end of another section. A first hole in each first end aligns with a second hole in each second end when one section is fitted into another section. The sections are linked in a positive lock by a fastener comprising one or more resilient legs, a stop and a lug. Each fastener snap fits within a first end of a section, with the resilient leg(s) biasing the lug to project through and beyond the first hole to an extent limited by the stop. Upon assembly of one section with another section, the lug projecting from the first hole of one section snap fits into the second hole of the other section to lock the sections together until the lug is depressed to release the second end for disassembly.

The sections are typically hollow elongated sections but it will be understood that other sections will be useful if the fastener can be inserted into a hollow end portion.

The resilient leg(s) of the fastener may press against an inner wall of the first end to bias the lug out through and beyond the first hole. The fastener preferably has two resilient legs splayed apart for stability. The resilient legs splay apart against an inner wall of a first end opposite a first hole to bias the lug out through and beyond the first hole. The lug preferably has vertical sides which act against the perimeter edge of a second hole of another section to lock the sections together. The stop acts against an inner wall about the first hole to limit the projection of the lug beyond the first hole to approximately one additional wall thickness so as to project slightly beyond the second hole after assembly. Preferably the stop is a base or stage upon which the lug is erected and from which the leg(s) depend.

In a member used for turning, such as an extension arm for a screw jack, each first end and second end will have at least one straight side to key the sections to transmit torque. Preferably the ends will be square, rectangular or other common geometric shapes known for the transmission of torque.

The assembly of the sections of the member is further facilitated by a dimple on the outermost of each second end of each section. The outwardly bent dimple rides over and presses inwardly the lug projecting from a first hole in another section as the second end is fitted over the first end.

It will be apparent to those skilled in the art that the sectional member of this invention is suitable for an extension arm of a jack.

BRIEF DESCRIPTION OF THE DRAWING

In the figures which illustrate the prior art and the present invention,

FIG. 4 is a perspective view of one section of the extension arm of the preferred embodiment of this invention.

FIG. 5 is an illustration of the fastening clip of this invention.

FIG. 6 is a side view of two sections of the extension arm in a disassembled state.

DETAILED DESCRIPTION OF THE DRAWINGS

In the figures which illustrate the preferred embodiment of this invention, like numerals indicate like elements.

Figure 1:
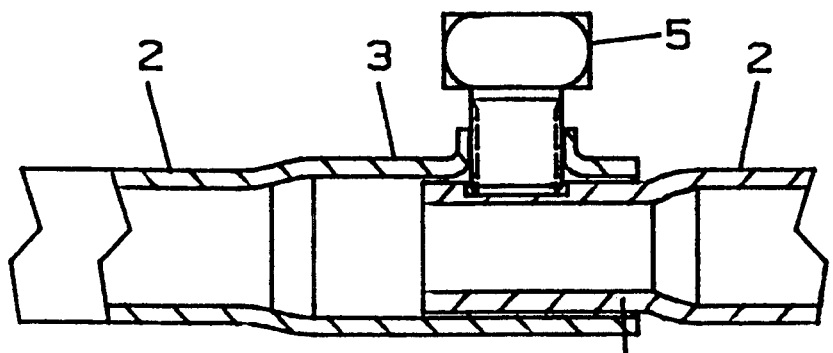
FIG. 1 is a picture of one prior art extension arm member having tubular sections with squared ends and set screws.
Figure 2:
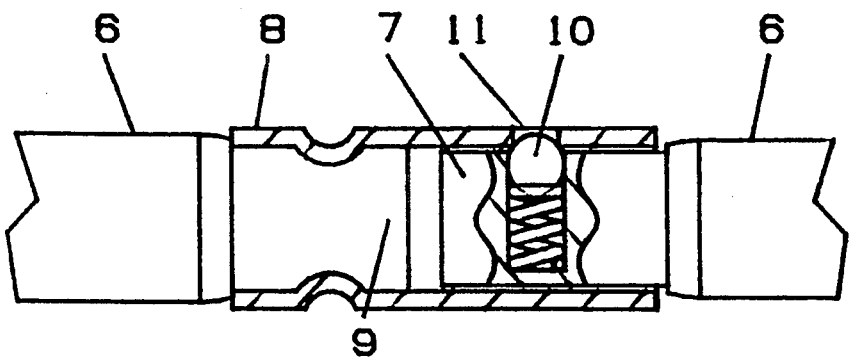
FIG. 2 is a depiction of another prior art device having a ball, spring, sleeve and bar arrangement.
Figure 3:
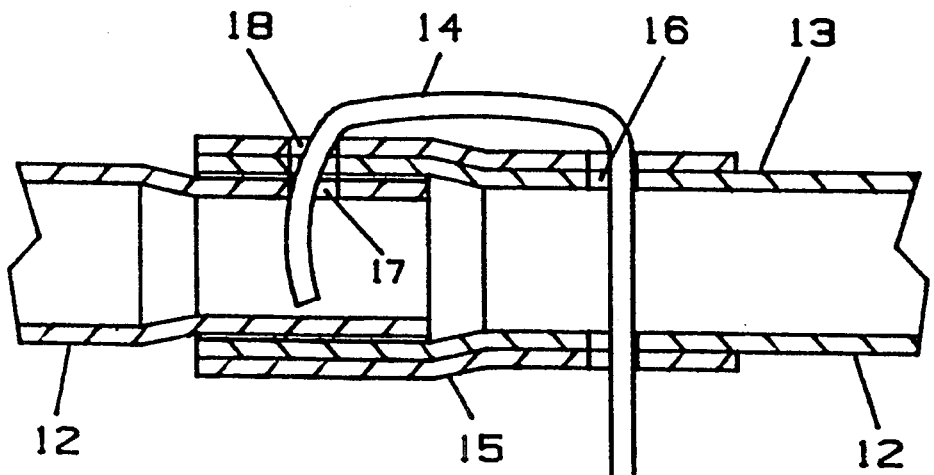
FIG. 3 is a depiction of a prior art device having tubular sections and a wire clip connection.

The prior art devices mentioned in the introductory portions of this application are shown in FIGS. 1, 2 and 3.

As illustrated in FIG. 1, the first prior art device has an extension arm comprising a series of hollow sections (2). Each such section (2) has an enlarged squared end (3) and a smaller squared end (4). Squared end (4) fits snugly within squared end (3). A set screw (5) is used to secure the two sections together when they are linked.

The second prior art extension arm in FIG. 2 has identical sections (6). A sleeve (8) is welded or crimped over an attenuated first end (9) of each section (6). The second end (7) of each section (6) has a ball and spring arrangement (10) which, upon assembly, presses into a hole (11) in sleeve (8). Similarly, the sleeve (8) rides over the ball and compresses the spring when the sections are pulled apart.

The third prior art device shown in FIG. 3, has similar sections (12) joined by a wire clip (14). A sleeve (15) is welded to a first end (13) to reinforce it. A hole (16) is drilled through sleeve (15) and first end (13) to receive one end of the clip (14). Another hole (17) is provided in the second end of section (12). A third hole (18) is provided in the sleeve (15) and in the first end (13). When the second end of a section (12) is inserted into the sleeve (15) so that holes (17) and (18) are in alignment, the clip (14) may be inserted into the aligned holes to fix the sections together. Upon disassembly, clip (14) is removed from holes (17) and (18) and sections (12) and (13) may be separated.

FIG. 4 illustrates a typical section (20) of the preferred embodiment of the extension arm of this invention. Some other sections may have a different end to link with other parts such as a jack. Section (20) comprises a hollow tube having a larger squared end (22) and a smaller squared end (23). The larger squared end (22) has a hole (24) in its upper surface and has an upwardly bent dimple (25) along the top edge of the squared surface just preceding the hole (24). The smaller end (23) has a hole (26) in its upper surface.

FIG. 5 illustrates a fastening clip (30) of this invention which includes two flexible legs (31), a lug (32) having vertical sides (33) and an upward and inward curved or bevelled edge (34). The flexible legs (31) hold the lug (32) in an elevated position and resiliently resist downward motion of the lug (32). The lug (32) may be round in crosssection as shown in FIG. 5 or some other suitable shape adapted to fit into holes (26) and (24) of adjoining sections (20). The sides of lug (32) are substantially vertical in order to catch against the sides of hole (24) to provide a positive locking as will be shown in the following description.

FIG. 6 illustrates a fastening clip (30) within a smaller squared end (23) of a section (20). The lug (32) projects through hole (26) so that the vertical sides (33) of lug (32) abut against its edges. The flexible legs (31) fit inside the smaller squared end (23) and resiliently press the lug (32) of the fastening clip (30) upwards to project out of hole (26) by an amount slightly greater than the wall thickness of section (20). A base (35) between the flexible legs (31) which has a greater dimension than hole (26) acts as a stop against the inside surface of the smaller squared end (23) to limit the projection of lug (32).

FIG. 6 also shows the larger squared end (22) of an adjoining section (20) having dimple (25) and hole (24) ready to receive the lug (32) of a fastening clip (31).

Figure 7:
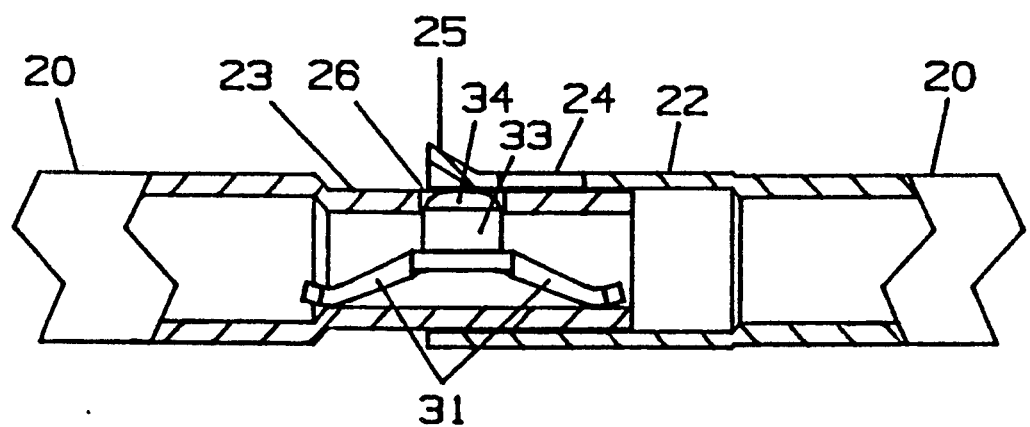
FIG. 7 is an side view of two sections about to be linked.
Figure 8:
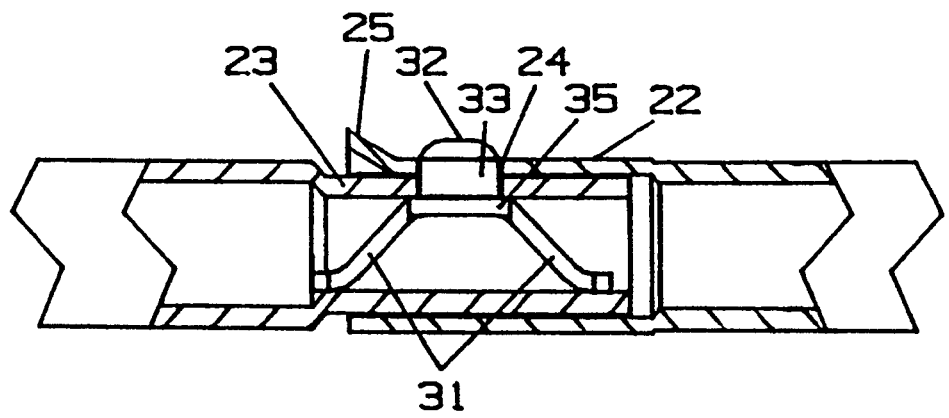
FIG. 8 is a side view of two sections after linkage.

The linkage of two juxtaposed sections (20) is illustrated in FIGS. 7 and 8. As first illustrated in FIG. 7, as the smaller end (23) is pushed into the larger end (22) of sections (20) the dimple (25) rides against the bevelled edge (34) of fastening clip (30) exerting a downward force on the flexible legs (31) which spread to permit the lug (32) to slide vertically downward in hole (26). When the dimple (25) completely depresses the lug (32) into the hole (26), the larger end (22) slides over the fastening clip until hole (24) is pushed over the lug (32) of the fastening clip (30). Then as shown in FIG. 8, the flexible legs (31) push the lug (32) of fastening clip (30) upwards into hole (24) where the vertical sides (33) abut against the edges of hole (24) to stop any further sliding motion in any direction. In this position, the fastening clip positively locks the sections together so that they may be pushed or pulled without separation of the sections (20).

When it is desired to separate the sections, the top of lug (32) is pressed below the level of the larger squared end (22). As the sections are pulled apart squared end (22) rides up the bevelled surface (34) of lug (32) to push the lug (32) down into hole (24) until it is below the inside surface of squared end (22). Then squared end (22) may be pulled off squared end (23). Fastening clip (30) is pressed resiliently upward by the flexible legs (31) to protrude above hole (26) in squared end (23) as permitted by stop (35).

Figure 9:
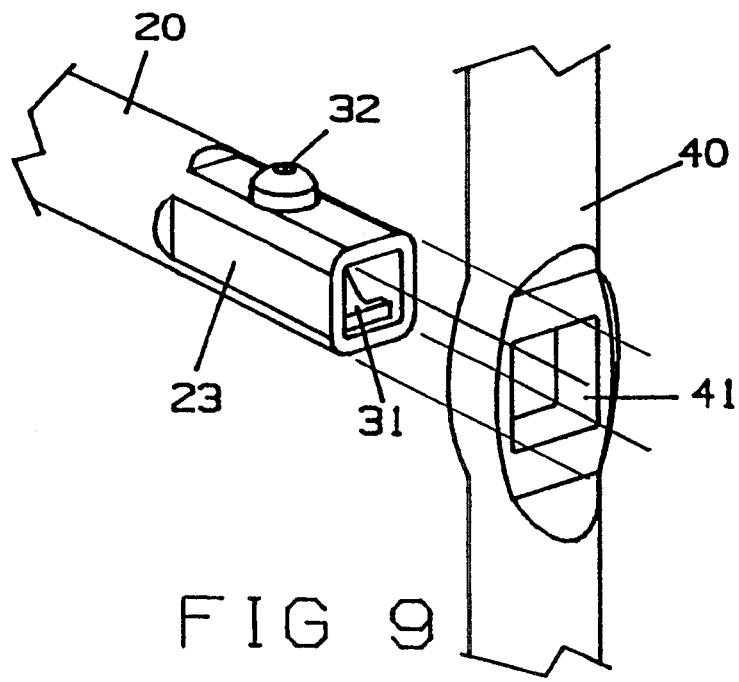
FIG. 9 is a detail of the connection of a wrench to the extension arm member to form a crank.
Figure 10:
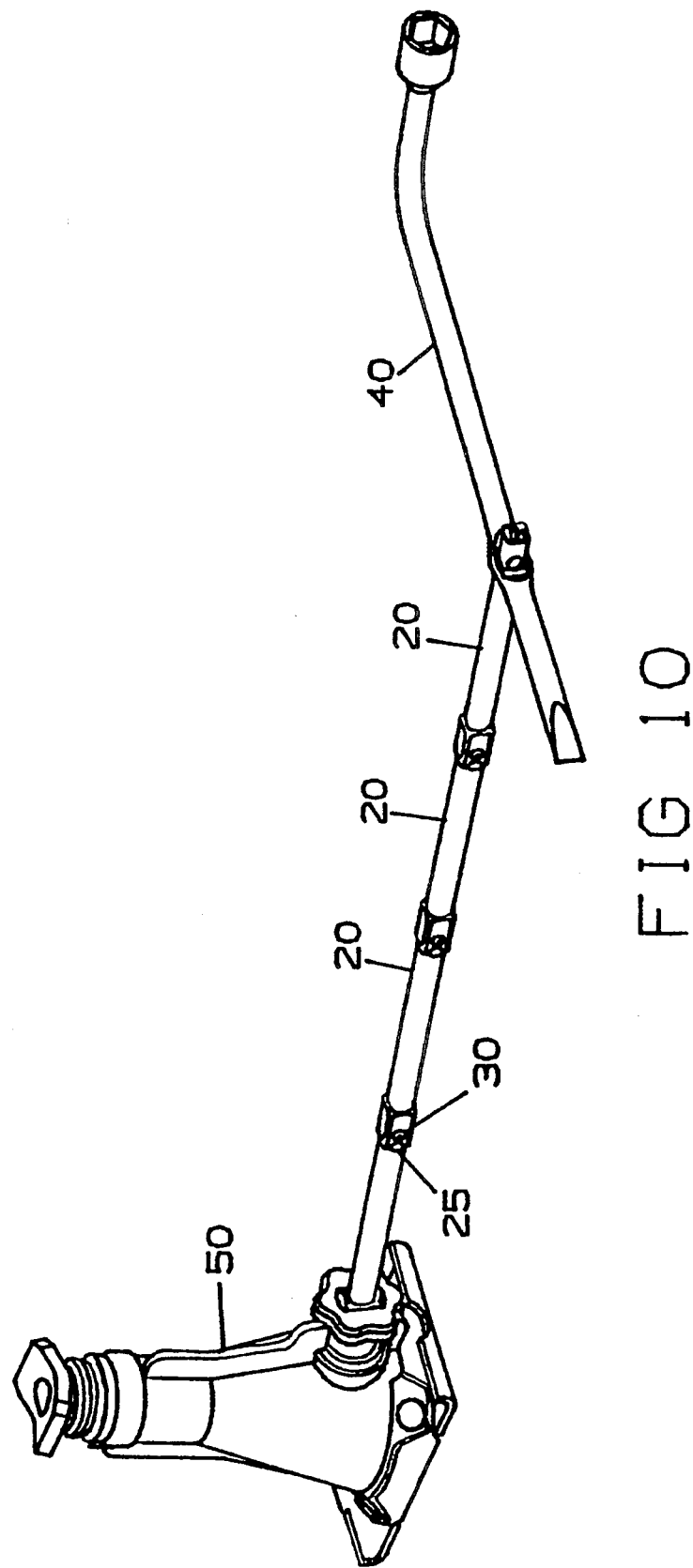
FIG. 10 is an assembly of the extension arm in a jack.

FIG. 9 illustrates how a crank handle may be fixed onto the last section (20) of the extension arm. As shown in FIG. 9, the crank (40) has a squared hole (41) adapted to fit over the smaller end (23). The lug (32) of the fastening clip (30) is pressed down by the operator to permit the hole (41) to be slipped over the projecting lug (32) so that the crank (40) is linked onto squared end (23). This is further illustrated in FIG. 10 in which the crank arm (40) is a wrench used to remove the nuts from the wheel of a vehicle. The linkage of sections (20) forms an extension arm which is inserted into a jack (50) for operation of the jack.

In operation of this preferred embodiment, the sections (20) are removed from storage in a vehicle (not shown) and assembled together by inserting the smaller squared ends into the larger squared ends (22). The fastening clip (30) being depressed by dimple (25) enters into a snap fit connection with hole (24), thereby linking adjoining sections (20). Each successive section (20) is linked onto the extension arm until the required length is achieved at which point the crank handle (40) may be snap fitted onto the outer most end (23). The extension arm thus formed can then be inserted into jack (50) for operation of the jack (50). The positive locked extension arm thus formed can be used to push the jack (50) into position under a vehicle or to pull the jack (50) from under the vehicle.

It will be appreciated by those skilled in the art that the fastening clip of this invention may be formed with flexible legs (31) as shown in the Figures or with other flexible legs of different shapes which obtain the same resilient spring force pressing the lug (32) upward and resisting downward movement. It is not necessary that there be two such legs. For example, a C-shaped or > shaped single leg might obtain the same purpose. The clip may be manufactured of any suitable flexible material. In a preferred embodiment, a plastic nylon clip is used because of the economies of manufacturing such a clip. However, it will be appreciated that a metal clip or other resilient material would also be suitable. It would also be possible to have such a clip made of more than one material, for example, having a metal lug over plastic, flexible legs.

One of the advantages of this clip is that it may be readily inserted into the smaller end (23) of each section (20) and snap fitted into a corresponding hole (26). This simple assembly step substantially reduces the cost of manufacture over a ball and spring type arrangement as illustrated, for example, in FIG. 2.

It will be appreciated by those skilled in the art that the description of the preferred embodiment of this invention is not intended to be limiting but rather merely illustrative. Changes in the elements or minor modifications to constituent elements of the combination will not depart from the scope of this invention.

What is claimed is:

1. A jack arm comprising:
a plurality of interconnected hollow tubular sections, comprising: a first end of at least a first said section and a second end of at least a second said section each having at least one straight side, said first end adapted to fit within said second end and to be keyed to said second end by said straight sides to resist torque applied thereto, and said first end having an inner wall; said second section also having a said first end; a first hole in said first end of said first section and a second hole in said second end of said second section, located in alignment with each other; and a fastener having a stop and two resilient legs splayed apart and extending from said stop, and a lug having side walls extending from said stop, said fastener snap fit within said first end of said first section with said resilient legs resiliently pressing against said inner wall to bias said lug out through and beyond said first hole with said stop abutting against an inner wall of said first section adjacent said first hole to limit the projection of said lug through and beyond said first hole, said lug projecting into said second hole of said second section and said side walls of said lug extending into and abutting the walls defining said second hole to lock said first and second sections together until said lug is depressed to release said second end for disassembly.

2. A jack arm as recited in claim 1 wherein said plurality of hollow tubular sections are substantially identical to each other.

3. A jack arm as recited in claim 2 wherein four of said hollow tubular sections are provided.

4. A jack arm as recited in claim 1 wherein a second end of one of said sections extends into engagement with an automobile jack.

5. A jack arm comprising:
a plurality of interconnected hollow tubular sections, comprising: a first end of at least a first said section and a second end of at least a second said section each having at least one straight side, said first end adapted to fit within said second end and to be keyed to said second end by said straight sides to resist torque applied thereto, and said first end having an inner wall; said second section also having a said first end; a first hole in said first end of said first section and a second hole in said second end of said second section, located in alignment with each other; and a fastener having a stop and at least one resilient leg depending from said stop, and a lug having vertical side walls on said stop, said fastener snap fit within said first end of said first section with said at least one resilient leg resiliently pressing against said inner wall to bias said lug out through and beyond said first hole with said stop abutting against an inner wall of said first section adjacent said first hole to limit the projection of said lug through and beyond said first hole, said lug projecting into said second hole of said second section and said side walls of said lug extending into and abutting the walls defining said second hole to lock said first and second sections together until said lug is depressed to release said second end for disassembly.

6. A jack arm as recited in claim 5 wherein said plurality of hollow tubular sections are substantially identical to each other.

7. A jack arm as recited in claim 6 wherein four of said hollow tubular sections are provided.

8. A jack arm as recited in claim 6 wherein a second end of one of said sections extends into engagement with an automobile jack.

* * * * *